United States Patent [19]
Kidd

[11] 3,952,962
[45] Apr. 27, 1976

[54] CABLE DRUMS

[75] Inventor: Patrick Michael Kidd, Southampton, England

[73] Assignee: Mackley-Ace Limited, Southampton, England

[22] Filed: Apr. 15, 1975

[21] Appl. No.: 568,182

[30] Foreign Application Priority Data
July 20, 1974 United Kingdom............... 32268/74

[52] U.S. Cl. ............................................. 242/54 R
[51] Int. Cl.[2] ......................................... B65H 75/00
[58] Field of Search............. 242/54 R, 55, 128, 68; 61/72.3

[56] References Cited
UNITED STATES PATENTS

| | | | |
|---|---|---|---|
| 19,278 | 2/1858 | Brauer | 242/54 R |
| 1,979,439 | 11/1934 | Benit | 242/54 R |
| 3,721,394 | 3/1973 | Reiser | 242/54 R |

*Primary Examiner*—Edward J. McCarthy
*Attorney, Agent, or Firm*—Holman & Stern

[57] ABSTRACT

A cable drum of the type which is penetrated from end to end by a central hole is provided with means for supporting the drum in an up-ended position on a cushion of pressurised fluid, (e.g. water). The said means comprise a flexible skirt of annular form disposed around the periphery of what, in use, is the lower end of the drum so as to define a cushion space, and water pump means whereby pressurised water can be supplied to said cushion space by way of the said central hole so as to support said drum.

The invention also comprises a method of unreeling a cable from a cable drum of the type which is penetrated from end to end by a central hole, comprising the steps of disposing the drum on a surface in an upright position, forming at least one cushion of pressurised fluid (e.g. water) beneath the lower end of the drum and allowing the drum to rotate about an upright axis whilst supported by said cushion.

8 Claims, 5 Drawing Figures

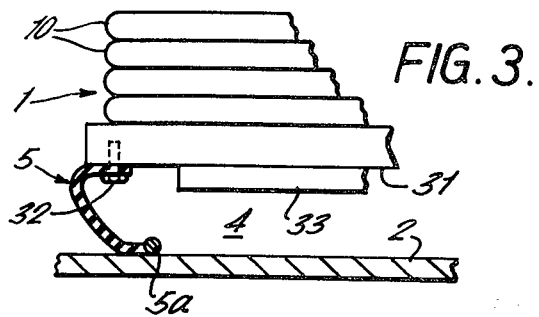
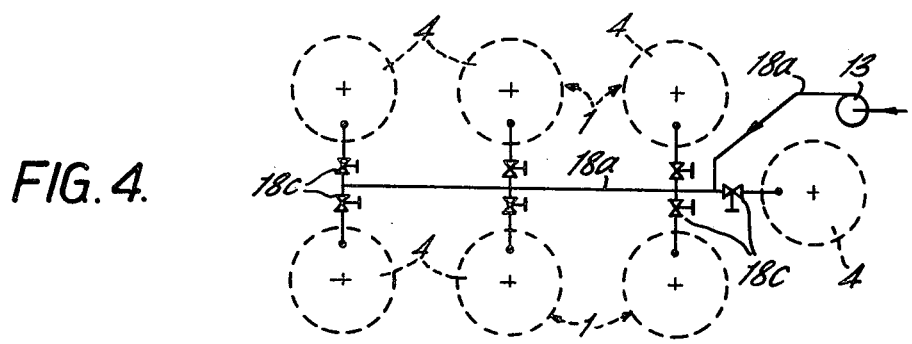
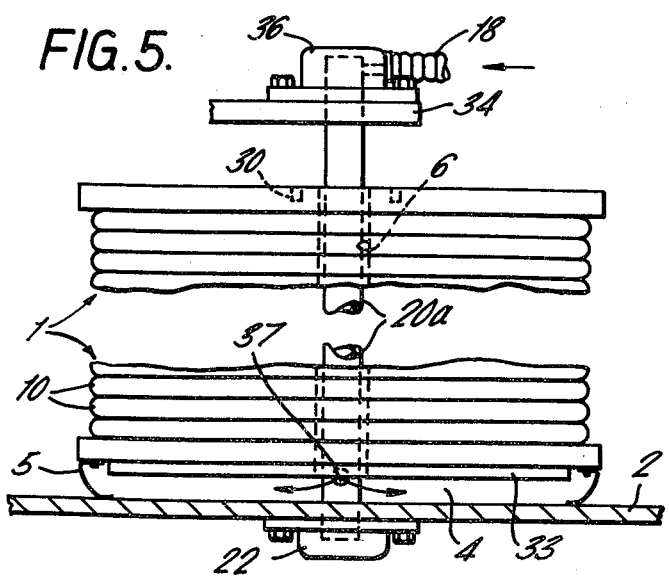

CABLE DRUMS

BACKGROUND TO THE INVENTION

This invention relates to cable drums and is also concerned with methods of, and apparatus for, using the drums for laying submarine cable.

When barges or similar vessels are used for submarine cable laying, the weight of a loaded drum (i.e. a drum wound with cable), which is about 30–35 tons, demands the use of a large (e.g. 50 ton) crane to lower the drum on to the barge, whereby it can rotate about a substantially horizontal axis, supported by trunnions. The drum is penetrated from end to end by a central hole which is used to locate a spindle about which the drum can rotate freely.

The crane is large and expensive and its use is therefore uneconomic, particularly as the laying barge has to return frequently for replacement of the drum.

SUMMARY OF THE INVENTION

According to a first aspect of the present invention, a cable drum penetrated from end to end by a central hole is provided with means for supporting the drum in an up-ended position on a cushion of pressurised fluid, said means comprising a flexible skirt of annular form disposed around the periphery of what, in use, is the lower end of the drum so as to define a cushion space, whereby pressurised fluid can be supplied to said cushion space by way of the said central hole.

The pressurised fluid is preferably a liquid (e.g. water) but a gas (e.g. air) may also be used.

Drums according to this first aspect of the invention may be transported, on their cushions, from a storage depot to the deck of the laying barge, thus avoiding the need of a crane for this purpose. They can thus be towed "on-cushion" by use of a small motorised transporter (such as a "LISTER" truck) or may even be moved by manual effort.

According to a second aspect of the present invention, a method of unreeling a cable from a cable drum comprises the steps of disposing the drum on a surface in an upright position, forming at least one cushion of pressurised fluid beneath the lower end of the drum and allowing the drum to rotate about an upright axis.

The drum used is preferably the drum according to the first aspect of the present invention, and here the pressurised fluid (liquid or gas) may be introduced to the cushion space by way of said central hole, or, alternatively, by way of supply inlet means penetrating said surface from beneath.

According to a third aspect of the present invention, a cable-laying vessel is provided with means for performing the method of the said second aspect of the present invention.

Where the drum is of the form according to the first aspect of the invention, the pressurised fluid (liquid or gas) may be introduced to the cushion space by way of said central hole, or, alternatively, by way of a supply inlet penetrating a deck surface of the vessel.

BRIEF DESCRIPTION OF THE DRAWINGS

The various aspects of the invention will now be described by way of example, with reference to the accompanying drawings, wherein:

FIG. 3 is a fragmentary side view, in section and to an enlarged scale, of part of FIG. 1, FIG. 4 is a semi-diagrammatic illustration of a modification, and FIG. 5 is a fragmentary side view, partly in section, of a further modification.

In the figures, like reference numerals refer to like components.

DETAILED DESCRIPTION OF THE INVENTION

Figure 1:
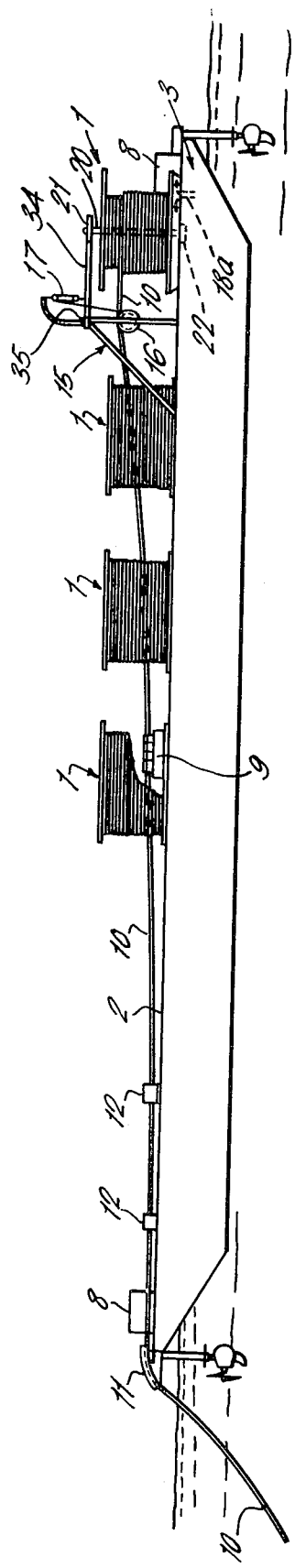
FIG. 1 is a side view of a cable-laying barge.
Figure 2:
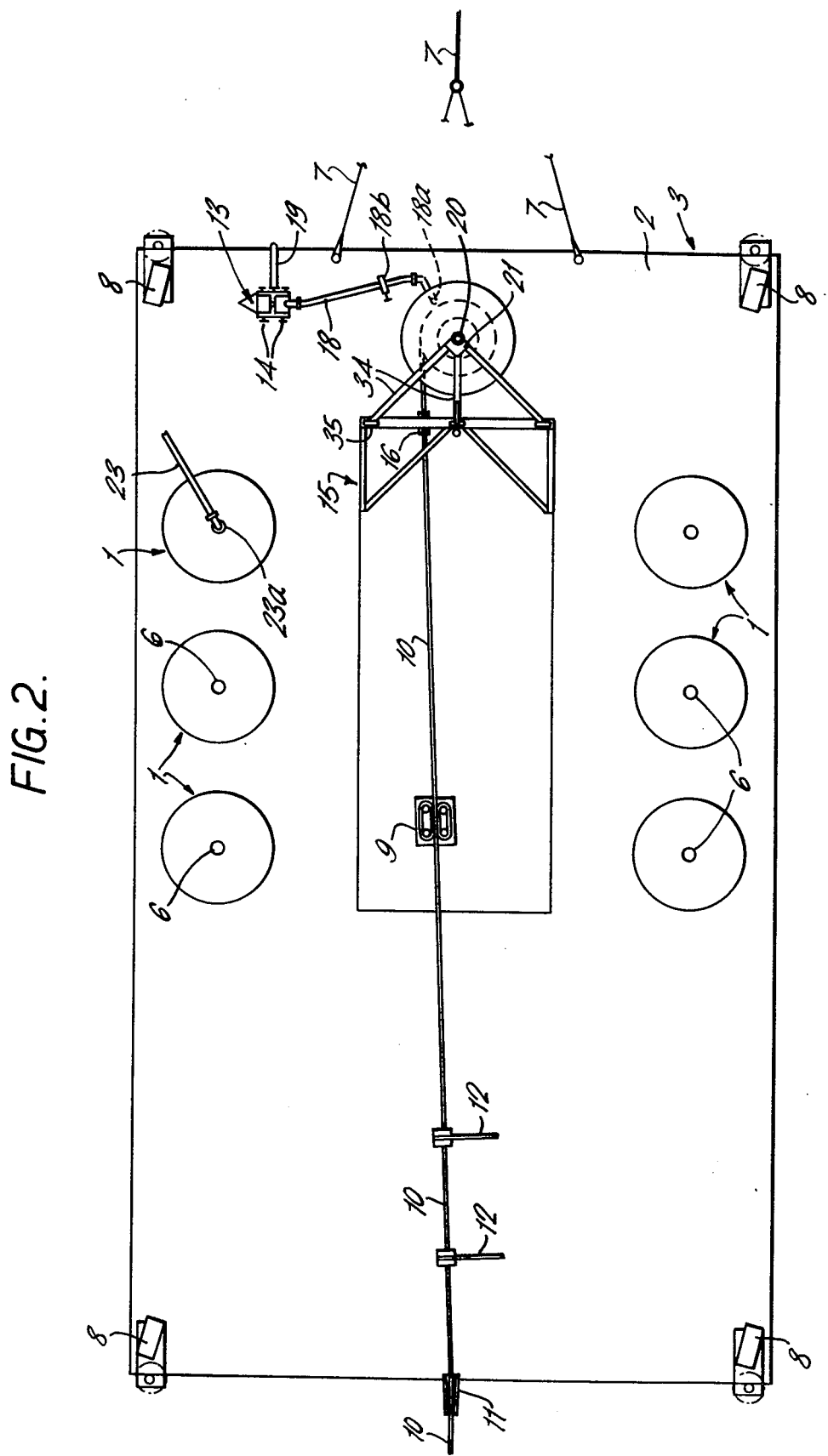
FIG. 2 is a plan view of the barge.

Referring first to FIGS. 1, 2 and 3, seven cable drums 1 each loaded with cable 10, are disposed in an up-ended position on the deck 2 of a cable-laying barge 3. Means are provided for supporting each drum 1 in its up-ended position on a cushion 4 of pressurised water, said means comprising (see FIGS. 1 and 3), a simple (i.e. single-walled) flexible skirt 5 of annular form disposed around the periphery of the lower end of the drum 1 to define a cushion space, whereby (see FIG. 2) the pressurised water can be supplied to the cushion space by way of a central hole 6 penetrating the drum from end to end, so as to support the drum.

In further detail, only one drum 1 is shown supported on its water cushion 4, namely the forward drum, which is the one in use, but each of the drums is provided with a flexible skirt 5 and so are capable of being supported by fluid cushions. The other six drums 1 are shown at rest "off-cushion", supported by the deck 2.

To form a fluid cushion, a flanged fluid supply duct of flexible form is connected to the upper end of a drum 1, and is secured thereto by bolts which screw into tapped holes 30 (FIG. 5) formed in the said upper end.

As best seen in FIG. 3, each flexible skirt 5 is of rubberised fabric and has an inwardly-flanged upper edge clamped to the bottom surface 31 of the lower end of the drum 1 by a ring of set bolt and washer assemblies 32. (A backing/load-spreading ring may also be employed). The skirt 5 is thus demountable. A restraint bead 5a is attached to the lower edge of the skirt 5. To protect the skirt 5 from damage when the drum 1 is off-cushion, and to assist "priming" of the cushion 4, a load-accepting disc 33 is attached to the bottom surface of the drum 1. The disc 33 has a central aperture (see FIG. 5) which is aligned with the hole 6 extending through the drum 1.

The seven drums 1 are transferred from a storage depot to the barge 3 by towing them on-cushion, using a small motorised truck carrying an air compressor unit which supplies the cushion fluid. On arrival, the seven drums 1 are fairly evenly distributed (as shown in FIG. 2) over the deck 2 of the barge 3.

The barge 3 is towed into position by a tug (not shown), using a towing bridle 7. Water-screw units 8 are diposed at the outboard extremities of the bow and stern ends of the barge 3 and can be used to assist propulsion of the barge, although their prime purpose is to manoeuvre the barge in all directions. The barge is further provided with a "caterpillar" cable winch 9 for initial unreeling of the cable 10, a stern-mounted guide channel 11 for the cable, and two manually-operated clamp-type cable over-run brakes 12. The barge 3 also carries a SYKES UV66 motor-driven portable water pump 13, which is movable about the deck 2 on wheels 14. The barge is provided with internal trimming tanks which use water for ballast.

In addition, the barge 3 is provided with a gantry 15 near the bow. The gantry 15 incorporates a sheave 16 rotatable about a horizontal axis but movable in a vertical plane by block and tackle 17. There is also a water supply duct 18 for connecting the outlet of the pump 13 with the cushion space of the drum 1 in use, by way of a water inlet 18a penetrating the deck 2 from beneath. The duct 18 is also provided with a flow control valve 18b. A flexible, reinforced, hose 19 enables the pump 13 to draw in sea water.

A spindle 20 penetrates the drum 1 in use. The upper end of the spindle 20 is located by a bearing 21 carried by a hinged stay 34 in the gantry 15 and the lower end of the spindle is located by a bearing 22 carried by the deck 2. The spindle 20 can be easily removed from its bearings and from the drum 1 by first folding back the stay 34 about its hinge 35.

In operation, with the seven drums 1 disposed on the barge deck as shown, the barge is towed to its cable-laying position. Up to this point all of the drums 1 rest off-cushion.

The drum 1 adjacent the gantry 15 is now brought on-cushion, using the pump 13 connected up as shown. The water cushion 4 serves as a fluid bearing, and allows easy rotation of the drum 1 about the upright axis of the spindle 20 as submarine cable 10 is unreeled from the drum. To allow for vertical "travel" of the cable 10 as it comes off the drum 1, the block and tackle 17 is used to allow the sheave 16 to "follow" the cable. Meanwhile the barge 3 is manoeuvred by use of the units 8.

When all the cable 10 on the drum 1 has been used, the "dry end" of the cable is secured and the drum 1 taken off-cushion by stopping the water pump 13. Next the stay 34 is folded back and the spindle 20 removed. The pump 13 is then disconnected from the duct 18. A flexible, reinforced, hose 23 with a flanged end 23a is next used to connect the outlet of the pump 13 with the upper end of the central hole 6 in the drum 1, using the tapped holes 30 (FIG. 5). The valve 18b is closed to prevent backflow of water through the inlet 18a, and the pump 13 re-started to re-form a water cushion 4. This allows the "used" drum 1 to be pushed clear of the gantry 15.

Next, the pump 13 is stopped, and the hose 23 disconnected and remade to a "fresh" drum 1. (In practice several hoses 23 are available, and preferably more than one pump 13 is provided). The pump 13 is then re-started to form a water cushion 4 and the replacement drum 1 pushed into position over the bearing 22. The pump 13 is then stopped, the hose 23 removed and the connection between pump 13 and duct 18 remade. Next, the spindle 20 is fitted in the hole 6 and lower bearing 22 and the stay 34 unfolded so that the bearing 21 can be used to locate the upper end of the spindle. The valve 18b can now be opened and the replacement drum 1 placed on-cushion, the "free" ends of cable 10 being inter-connected before cable relaying continues.

As drums 1 are manoeuvred about the deck 2, the trimming tanks can be used to balance out the shift in barge loading.

Water is preferred to air as a cushion fluid. To form a cushion 4 from water only 15 H.P. is required, whereas if air is used about 400 H.P. has to be used.

The propulsion units 8 can also be used to position the barge when it is in close proximity to a structure, for example, an offshore oil rig.

FIG. 4 illustrates a modification wherein the drums 1 are allowed to remain in place on the deck of the barge. In this arrangement the fixed gantry 15 is replaced by a portable gantry of similar form but which is mounted on a wheeled carriage so that it can be moved from drum to drum. Once in position, the carriage is secured to the deck 2 by bolts. The duct 18a beneath the deck is provided with seven outlets whereby a cushion 4 of pressurized water can be formed beneath any of the seven drums 1. Isolating flow control valves 18c are fitted in each of the outlets.

FIG. 5 illustrates a modification wherein a hollow spindle 20a is employed, the upper end of the spindle being located by a bearing/rotary seal unit 36 carried by the hinged stay 34 and connected to the duct 18. The lower end of the spindle 20a is perforated by fluid outlet holes 37 whereby pressurised fluid is introduced beneath the drum 1 to form the cushion 4. This arrangement avoids any need to penetrate the deck 2.

I claim:

1. A cable drum penetrated from end to end by a central hole, and provided with means for supporting the drum in an up-ended position on a cushion of pressurised fluid, said means comprising a flexible skirt of annular form disposed around the periphery of what, in use, is the lower end of the drum so as to define a cushion space, whereby pressurised fluid can be supplied to said cushion space by way of the said central hole so as to support said drum.

2. A cable drum as claimed in claim 1 wherein the flexible skirt is demountably attached to said drum.

3. A method of unreeling a cable from a cable drum penetrated from end to end by a central hole comprising the steps of disposing the drum on surface in an upright position, forming at least one cushion of pressurized fluid beneath the lower end of the drum and allowing the drum to rotate about an upright axis whilst supported by said cushion.

4. The method of claim 3, wherein the upright axis is defined by a hollow spindle and means are provided for supplying cushion fluid to the space occupied by said cushion by way of said hollow spindle.

5. The method of claim 3, wherein cushion fluid is supplied to the space occupied by said cushion by way of supply inlet means penetrating said surface from beneath.

6. The method of claim 5, applied to a plurality of drums wherein a plurality of inlet means are provided.

7. A cable-laying vessel provided with means for performing the method of claim 3.

8. A cable-laying vessel as claimed in claim 7 wherein said surface is the deck of the vessel.

* * * * *